UNITED STATES PATENT OFFICE.

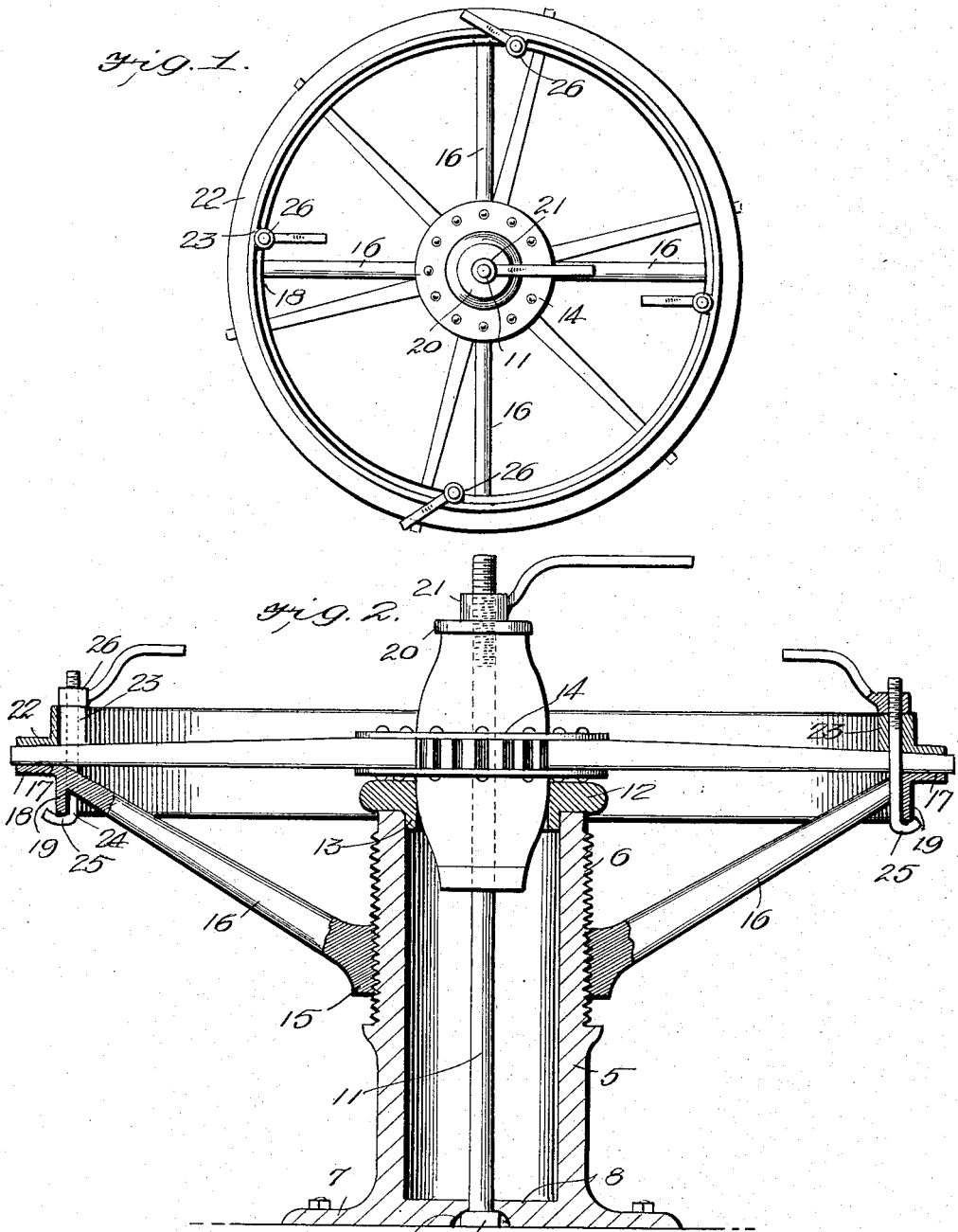

ORLEY B. GRAVES, OF COFFEYVILLE, KANSAS.

WHEELWRIGHT-MACHINE.

1,172,449.  Specification of Letters Patent.  Patented Feb. 22, 1916.

Application filed June 8, 1915. Serial No. 32,884.

*To all whom it may concern:*

Be it known that I, ORLEY B. GRAVES, a citizen of the United States, and a resident of Coffeyville, in the county of Montgomery and State of Kansas, have invented certain new and useful Improvements in Wheelwright-Machines, of which the following is a specification.

This invention relates to an improvement in wheelwright machines, and one of the principal objects of the invention is to provide an improved machine or wheel chuck by means of which a wheel may be respoked, retired, bolted, dished, and riveted with a degree of accuracy and rapidity not ordinarily attainable with machines of this nature.

Another object of the invention contemplates the provision of a machine of the class described in the nature of a stand upon which are disposed a hub supporting bushing and an adjustable spoke supporting ring adapted to be used by itself or in connection with an auxiliary ring in acquiring the proper adjustment of spokes and hub, for giving the required dish to the wheel, means being provided for maintaining the wheel upon the machine while it is being worked upon.

A further object of the invention is to provide a machine of the class described which will be extremely simple, durable, efficient in operation and inexpensive to manufacture.

With these and other objects in view, which will become apparent as the description proceeds, the invention resides in the construction, combination and arrangements of parts hereinafter more fully described and claimed, and illustrated in the accompanying drawing in which like characters of reference indicate like parts throughout the several figures, of which—

Figure 1 represents a top plan view of the machine constructed according to my invention, Fig. 2 represents an enlarged, vertical, transverse, sectional view taken therethrough, a wheel being indicated as in position on a machine in both figures.

In carrying out my invention I provide a hollow cylindrical stand 5, which adjacent its upper end is exteriorly threaded as at 6, and at its lower end is provided with an outwardly extending annular flange 7. The latter may be utilized as a medium for the reception of fastening means whereby the stand may be secured to a block, or to the floor of the wheelwright's shop, or to some suitable foundation. The lower end of the stand is closed by a floor 8, and this floor on its outer surface is centrally recessed or hollowed as at 9, for the reception of the head 10 of a central rod or shaft 11. The latter extends through an opening in the floor and projects at its upper end beyond the upper end of stand 6, and said rod or shaft is disposed in the axis of the hollow stand.

The upper end of stand 6 is adapted to receive an annular hub supporting bushing 12. The latter is provided with a downwardly extending annular flange 13, adapted to engage within the stand 6 at the upper end thereof. Through the opening in the bushing 12 the hub of the wheel is adapted to extend in the manner indicated in Fig. 2, the hub flanges or rings 14 being supported upon the bushing. When the hub is positioned on the bushing, the rod 11 extends through the hub in the manner shown. Various sizes of bushings may be provided for use with different sized wheel hubs, it being understood that the bushings will be each made to fit snugly on the hollow stand.

Turned upon the upper end of the stand is a threaded collar 15 which is connected by the upwardly and radially extending arms 16 with the spoke supporting ring 17. A plurality of arms 16 is provided for supporting the ring 17 and the arms are arranged preferably at equi-distant intervals from each other. The ring 17 is substantially in the form of an annular angle-iron, including an outwardly extending flange 18, and a downwardly extending flange 19. The collar 15, arms 16 and ring 17 may, if desired, be cast in a single piece, although, if preferable, that may be made separately and suitably connected together to form a rigid member. The wheel or ring 17 may be rotated relatively to the hollow stand 6, and by reason of the threaded connection between the collar 15 and the stand, the ring may thus be shifted upwardly and downwardly relatively to the bushing.

A washer or follower 20 is adapted to be slidably disposed upon the upper threaded end of shaft 11 above the hub, and a handnut 21 is then turned upon the rod or shaft for forcing the washer down upon the hub in order to maintain the latter securely upon the bushing 12.

In case a wheel is dished too much, the spoke supporting ring may be turned in one direction for forcing the wheel spokes upwardly relatively to the hub, whereby to reduce the dish in the wheel.

In straightening out a wheel which is dished backwardly, or in springing a wheel to acquire the desired dish, I use an auxiliary ring 22 in conjunction with the ring 17. This auxiliary ring is likewise in the form of an annular angle-iron, and is provided at equi-distant intervals on its inner surface with eyes or sleeves 23, through which bolts 24 slidably extend. These bolts at their lower ends are provided with hooks 25 and at their upper ends are threaded for the reception of hand-nuts 26. In using the auxiliary ring, the same is placed upon the upper surfaces or edges of the spokes, and the hooks are engaged upon the downwardly extending flange 19, and the hand-nuts then turned downwardly to tighten the auxiliary ring upon the spokes. By then turning the hub supporting ring 17 relatively to the stand 6 in such manner as to lower the ring, the desired dish may be acquired. In this operation the carriage or wagon wheel will turn with the ring 17, and the bushing 12 will turn with the wheel and rotate upon the upper end of the stand. If found desirable, the hand-nut 21 may be unloosened until the desired dish has been attained, and may be then tightened down upon the washer 20 for securing the hub in position.

In using the device it is proposed to place the wheel upon the same, so that the outer face of the wheel will be downward and thus the heads of the rivets which extend through the hub flanges or rings 14 will lie upon the bushing 12, so that the opposite ends of the rivets may then be mashed or turned down upon the adjacent hub ring. In this manner, the bushing acts as a means for supporting the rivets while they are being flattened.

Although I have described the preferred embodiment of my invention, I may desire to make such changes in the construction, combination and arrangements of parts thereof, as do not depart from the spirit of the invention and the scope of the appended claims.

I claim:

1. The herein described wheelwright machine, consisting of a hollow stand adapted to be connected to a base, and having its upper end exteriorly threaded, a rod extending axially within the stand and having a threaded upper end projecting above said stand, a bushing adapted to be arranged upon the upper end of the stand, and being provided with a downwardly extending flange engaging within the stand, said bushing adapted to receive the hub of a wheel, a collar threaded upon the stand and adapted to be turned relatively thereto and being provided with a plurality of radially extending arms, a spoke supporting ring carried by the arms for supporting the spokes of the wheel, an auxiliary ring adapted to be arranged upon the spokes and being provided with a plurality of bolts movable relatively to the auxiliary ring and provided with means for engaging said spoke supporting ring, means whereby said bolts may be tightened upon the spoke supporting ring, whereby to tighten said auxiliary ring upon the spokes, a follower slidably disposed upon the upper end of said rod and adapted to bear upon said wheel hub, and means connected with the rod and adapted to be turned upon the threaded portion thereof, into engagement with the follower, for tightening the wheel hub upon the bushing.

2. The herein described wheelwright machine, consisting of a hollow exteriorly threaded stand, a rod extending axially of the stand, and projecting at one end beyond the upper end of said stand, a bushing removably disposed upon the upper end of the stand and adapted to receive the hub of a wheel, a spoke supporting ring having a threaded connection with the stand whereby the ring may be adjusted vertically with respect to the stand, an auxiliary ring, means adapted to detachably connect said spoke supporting ring and said auxiliary ring, for adjusting them toward and away from each other, and means associated with the rod for tightening the wheel hub upon the bushing.

3. A device of the class described, including a hollow stand provided with an axially extending rod, projecting at one end beyond the upper end of the stand, a bushing detachably connected with the stand upon the upper end thereof, and adapted to receive a wheel hub, said rod adapted to extend through said hub, a spoke supporting ring connected with the stand and adapted to be adjusted vertically relatively thereto, an auxiliary ring, means connecting said spoke supporting ring and auxiliary ring, whereby the latter may be clamped with reference to the spoke supporting ring, and means whereby the hub may be forced against said bushing.

ORLEY B. GRAVES.

Witnesses:
M. F. McBeth,
R. F. Allen.

Copies of this patent may be obtained for five cents each, by addressing the "Commissioner of Patents, Washington, D. C."